United States Patent
Dawson et al.

(10) Patent No.: US 7,833,299 B2
(45) Date of Patent: Nov. 16, 2010

(54) FILTERS AND FILTER ASSEMBLIES WITH BYPASS SEAL

(75) Inventors: Bruce Dawson, Longmont, CO (US); Thaddeus Ptak, Longmont, CO (US); Rex Coppom, Longmont, CO (US)

(73) Assignee: StrionAir, Inc., Louisville, CO (US)

( * ) Notice: Subject to any disclaimer, the term of this patent is extended or adjusted under 35 U.S.C. 154(b) by 1314 days.

(21) Appl. No.: 11/050,146

(22) Filed: Feb. 3, 2005

(65) Prior Publication Data

US 2006/0168926 A1   Aug. 3, 2006

(51) Int. Cl.
*B01D 46/00* (2006.01)
*B01D 53/30* (2006.01)

(52) U.S. Cl. .................. 55/385.2; 55/484; 55/495; 55/498; 55/502; 55/510; 55/521; 55/497; 55/482; 55/483; 55/485; 55/486; 55/DIG. 31; 454/187; 454/294

(58) Field of Classification Search .............. 55/500, 55/502, 490, 497, 495, 481, 486, 493, 506, 55/DIG. 5, 385.2, 484, 498, 510, 521, 482, 55/483, 485, DIG. 31; 264/DIG. 48; 454/187, 454/294

See application file for complete search history.

(56) References Cited

U.S. PATENT DOCUMENTS

| | | | | |
|---|---|---|---|---|
| 3,386,580 A | * | 6/1968 | Grabarczyk | 209/237 |
| 3,707,046 A | * | 12/1972 | De Baun | 55/483 |
| 3,849,092 A | * | 11/1974 | Bakke et al. | 55/302 |
| 4,277,267 A | * | 7/1981 | Posner | 55/494 |
| 4,464,187 A | * | 8/1984 | Kershaw | 55/501 |
| 4,765,810 A | * | 8/1988 | Wetzel | 96/417 |
| 4,853,005 A | | 8/1989 | Jaisinghani et al. | |
| 4,865,637 A | * | 9/1989 | Gruber | 96/136 |
| 4,940,470 A | | 7/1990 | Jaisinghani et al. | |
| 5,403,383 A | | 4/1995 | Jaisinghani | |
| 5,549,735 A | | 8/1996 | Coppom | |
| 5,593,476 A | | 1/1997 | Coppom | |
| 5,797,975 A | * | 8/1998 | Davis | 55/493 |
| 5,853,445 A | * | 12/1998 | Wong et al. | 55/343 |
| 5,865,674 A | * | 2/1999 | Starr | 454/187 |
| 6,117,202 A | * | 9/2000 | Wetzel | 55/385.2 |
| 6,162,272 A | * | 12/2000 | Michaelis et al. | 55/497 |
| 6,210,458 B1 | * | 4/2001 | Shindo et al. | 55/486 |
| 6,245,126 B1 | | 6/2001 | Feldman et al. | |
| 6,245,132 B1 | | 6/2001 | Feldman et al. | |
| 6,264,713 B1 | * | 7/2001 | Lewis, II | 55/481 |
| 6,267,796 B1 | * | 7/2001 | Schottmer | 55/502 |
| 6,270,546 B1 | * | 8/2001 | Jeanseau et al. | 55/385.2 |
| 6,306,298 B1 | * | 10/2001 | Diemer | 210/232 |

(Continued)

FOREIGN PATENT DOCUMENTS

DE    4229135 C1 *   9/1992   ................. 55/502

*Primary Examiner*—Robert A Hopkins
*Assistant Examiner*—Minh-Chau T Pham
(74) *Attorney, Agent, or Firm*—Miller, Matthias & Hull (57) ABSTRACT

A filter element having a frame defining an interior volume and having exterior surfaces. Filter media is mounted within the frame so as to allow fluid to enter an upstream side of the media and exit a downstream side of the media. At least one component of a multi-component filter frame seal, the at least one component being positioned on an outer surface of the frame and substantially circumscribing the filter frame at a location selected to align to a complementary component of the multi-component filter frame seal. The complementary component is provided separately from the filter element.

18 Claims, 6 Drawing Sheets

U.S. PATENT DOCUMENTS

| | | |
|---|---|---|
| 6,368,391 B1 | 4/2002 | O'Hara et al. |
| 6,413,301 B1 | 7/2002 | O'Hara et al. |
| 6,454,826 B2 * | 9/2002 | Fath et al. ..................... 55/490 |
| 6,572,685 B2 | 6/2003 | Dunshee |
| 6,740,136 B2 * | 5/2004 | Duffy ......................... 55/497 |
| 6,758,884 B2 | 7/2004 | Zhang et al. |
| 6,881,238 B2 * | 4/2005 | Marchart et al. .............. 55/495 |
| 7,122,120 B2 * | 10/2006 | Diel ......................... 210/232 |
| 7,261,757 B2 * | 8/2007 | Duffy ......................... 55/502 |
| 7,320,720 B2 * | 1/2008 | Ticknor ....................... 55/483 |
| 7,419,524 B2 * | 9/2008 | Caesar et al. ................. 55/482 |
| 7,507,271 B2 * | 3/2009 | Caesar et al. ................. 55/495 |
| 2002/0152890 A1 | 10/2002 | Leiser |
| 2002/0170435 A1 | 11/2002 | Joannou |
| 2003/0079609 A1 | 5/2003 | Lobiondo, Jr. |
| 2004/0025695 A1 | 2/2004 | Zhang et al. |
| 2007/0084167 A1 * | 4/2007 | Ticknor ....................... 55/484 |
| 2008/0105126 A1 * | 5/2008 | Kawano et al. ................ 96/11 |
| 2009/0320422 A1 * | 12/2009 | Braunecker et al. ........... 55/483 |

* cited by examiner

FILTERS AND FILTER ASSEMBLIES WITH BYPASS SEAL

BACKGROUND OF THE INVENTION

1. Field of the Invention

The present invention relates, in general, to electrically enhanced air filtration and, more specifically, systems and methods for reducing air bypass between adjacent filter assemblies and between filter assemblies and adjacent surfaces of housings and/or racks in which the filter assemblies are mounted.

2. Relevant Background

Gas filtration, and more specifically air filtration, is used in a wide variety of applications ranging from automobiles, homes, office buildings and manufacturing facilities. In many cases filtration systems are used to remove pollutants such as dust, particulates, microorganisms and toxins from breathing air, although filtration systems and processes may be used to purify manufacturing environments, process gasses, combustion gasses and the like.

One particular application is for heating, ventilation, and air conditioning (HVAC) systems within buildings. HVAC systems are designed to circulate air throughout a building. HVAC systems comprise a motor and blower that moves air from a supply through ductwork that distributes the air throughout building spaces. The air supply may be outside air, re-circulated from inside the building, or a mixture of outside and re-circulated air. Toxic material entering an intake will spread quickly through the entire building. Moreover, any duct that is accessible can be used to spread contaminants. Hence, although HVAC systems contribute significantly to occupant comfort, safety, and health, and are one of the prime lines of defense against emergencies and hazards they can also quickly become a threat to the security and safety of a facility and its occupants.

Conditioning systems such as heat exchangers, humidifiers, dehumidifiers, and the like are positioned in-line with the ductwork to adjust various characteristics of the supplied air before it is delivered to building spaces. Air filtration systems are placed in-line with the ductwork to filter out particulates, organisms, odors and noxious gases from the air that are present within the flow of air. Air filtration systems used in commercial environments typically comprise a filter rack mounted inside a main duct. Small systems may include a single replaceable filter mounted in the rack. More frequently, however, the filter rack forms a grid defining multiple cells where a filter is positioned in each cell. The filter rack can be formed of extruded metal having protrusions forming integral tracks for holding filter elements. Filter elements comprise a paper or plastic frame, usually square or rectangular in shape, with filter media mounted inside the frame. A wide variety of filter media are available including loose pile fibers, woven fibers, pleated fabric, and the like. Filter elements are positioned in the tracks by sliding them in from the side (or top in unusual configurations), or by placing them in from the front or back of the rack.

In many buildings, air bypassing the filter cells is a significant problem. Air bypass means that some portion of the air is not being filtered. Air bypass can be caused by air leaking around the rack, leaking between the filter cells and the rack, old or missing gasket material, or leakage between the filter cells. Originally, the purpose of filtration in HVAC equipment was to prevent contaminants from fouling the motor/blower and cooling coils, and the like. Hence, filters were initially installed for equipment protection, not human protection. Since equipment protection mainly involved removing large particles, there was little perceived need to install a filter that was efficient at removing small particles. Filters for equipment protection are very open and therefore relatively inexpensive, since they contain relatively little filter media, and inexpensive frame material can be used as there was little concern regarding air bypass. Although such filters have a characteristically low purchase/replacement cost and low operating cost rather than improved indoor air quality, they only filter out large particulate matter such as dust, allowing smaller particulates to pass through. Air bypass has been a low-priority concern for systems in which low-cost, low-efficiency filter media already allow so much particulate matter that eliminating air bypass would provide negligible improvement. Moreover, air bypass actually reduces air resistance, and so can reduce operating energy costs.

There has been little effort to develop systems that reduce air bypass except in high-end filtration system used in, for example, electronics manufacturing, medical research facilities, and the like. In these high-end systems air bypass is specifically addressed by gel or grease seals between mating surfaces of filter elements and between the frame and filter elements. These systems work well, but are expensive to install and maintain. As a result, they are used primarily for special-purpose installations and are not practical for general-purpose commercial HVAC systems.

Filter frame elements may be formed by injection molding or similar type processes. In its simplest variation, the frame is directly formed as a unitary structure. A simple technique for this is described in U.S. Pat. No. 2,032,262 where a pleated filter is held in a jig with only the edge portions extending out of the jig. Filter frames can also be formed from multiple pieces, which are then assembled by use of adhesive, welding, friction fit, snap fits, mechanical fasteners or the like. This type of approach permits more flexibility in terms of frame forms and functionality than unitary filter frames, however, it generally results in framed filters which are complicated to manufacture while often not providing an airtight seal around the filter media. U.S. Pat. No. 6,406,509, which is incorporated herein by reference, describes a framed filter media produced using a continuous extruded frame that is notched so that the extrusion can be bent at the notches to form an enclosing frame. Each of these structures fails to prohibit air bypass between adjacent filter elements or between filter elements and the housing or filter rack in which they are positioned.

Accordingly, a need exists for filters and filter assemblies with bypass seal to reduce or prevent air bypass between adjacent filter elements or between filter elements and the housing or filter rack in which they are positioned.

SUMMARY OF THE INVENTION

Briefly stated, the present invention involves a filter element having a frame defining an interior volume and having exterior surfaces. Filter media is mounted within the frame so as to allow fluid to enter an upstream side of the media and exit a downstream side of the media. The element further comprises at least one component of a multi-component filter frame seal, the at least one component being positioned on an outer surface of the frame and substantially circumscribing the filter frame at a location selected to align to a complementary component of the multi-component filter frame seal. The complementary component is provided integrally with the filter frame element or separately from the filter element.

DETAILED DESCRIPTION OF THE PREFERRED EMBODIMENTS

The present invention is illustrated and described in terms of an active electrically enhanced air filtration system. Active electrically enhanced air filtration operates using externally applied electricity to polarize the filter media and improve particulate capture efficiency without the air flow restriction normally encountered with purely mechanical high capture efficiency solutions. Using externally applied electricity enables higher voltages and corresponding higher collection efficiencies. For example, U.S. Pat. No. 5,549,735 and U.S. Pat. No. 5,593,476, incorporated herein by reference and which are assigned to StrionAir, Inc., describe an electrically enhanced fibrous air filter that uses polarized filter medium in combination with an upstream pre-charge system to impart a charge on particulates before they reach the polarized filter media. However, the present invention provides improvements in a wide variety of air filtration systems where air bypass between filter elements or between filter elements and the housing or racks in which they are positioned are problems.

Figure 1:
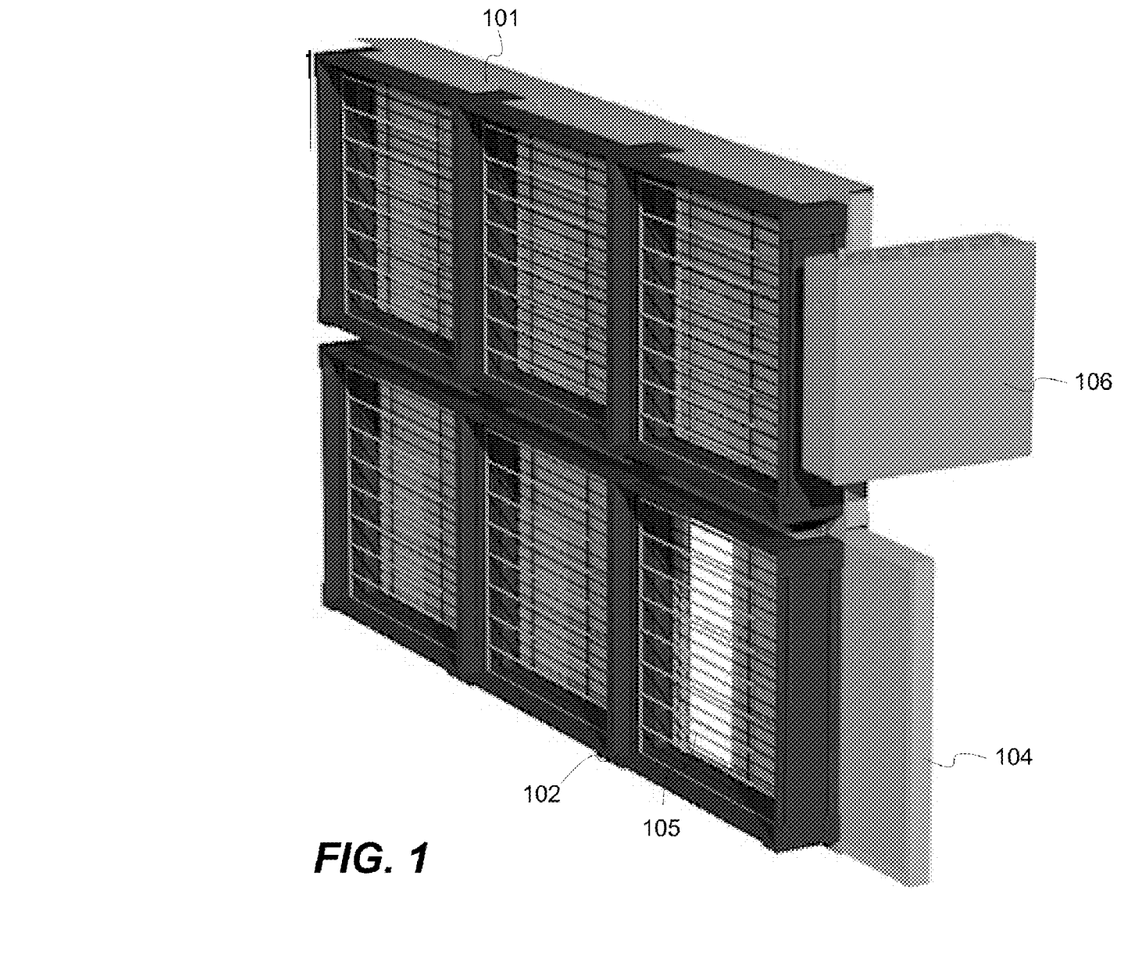
FIG. 1 shows an assembly for an air handling system that provides an array of replaceable filter elements having bypass seals in accordance with the present invention.

FIG. 1 shows an assembly for an air handling system that provides an array of replaceable filter elements having bypass seals in accordance with the present invention. Housing 101 is a supporting structure that houses one or more rows of filter elements. Housing 101 defines an array of cells where each cell comprises an ionization array 102, upstream electrode 105, an optional prefilter (not shown), a filter element 104, and/or other components that are used in a particular application. A bypass seal, visible in the subsequent Figures, is provided on filter element 104. The various components are arranged sequentially in the direction of air flow. The cellular or modular arrangement defined by housing 101 allows the system to be scaled to larger and smaller systems to meet the needs of a particular application.

Housing 101 is formed integrally with or affixed to the ductwork of an air handling system such that air passes from an upstream side facing the viewer in FIG. 1 to a downstream side that is away from the viewer in FIG. 1. In the case of an electrically enhanced air filtration shown in FIG. 1, ionizing arrays 102 and filter elements 104 are connected to electrical power supply 106. In implementations that do not use active electrical enhancement, ionization array 102 and power source 106 would not be present and housing 101 would define a simple array of filter elements 104. In some embodiments, housing 101 would not be provided at all.

Housing 101 may include a rack system that define horizontal rails that support ionization units 102, filter elements 104, or other components of the air handling system. The rack system comprises an upper rail 111 and a lower rail 112 having channels formed therein to hold filter elements 104, prefilters if used, and ionization units 102. When more than one row of cells is provided one or more horizontal center rails 113 are provided to define each row. Although the rack shown in FIG. 1 is oriented horizontally, (i.e., with horizontally oriented channels) it can be oriented vertically as well by essentially rotating the structure 90 degrees.

One feature of the present invention is that edges of framed filter elements 104 are adapted with complementary or interlocking air bypass systems to lessen or prevent air flow between adjacent filter elements 104. Another feature of the present invention is that the downstream edges of filter elements 104 may be fitted with gasket material so as to lessen or prevent air flow between filter frames 104 and the rack and/or housing in which they are positioned. In prior systems gasket material to prevent such air flow may have been provided on the rack or housing itself. As the system aged the gaskets would wear out and gradually allow air bypass. Replacing the gasket material was difficult and labor intensive. By placing the gasket material on the replaceable filter element 104, the gasket material can be refreshed each time a filter element 104 is replaced.

Figure 2:
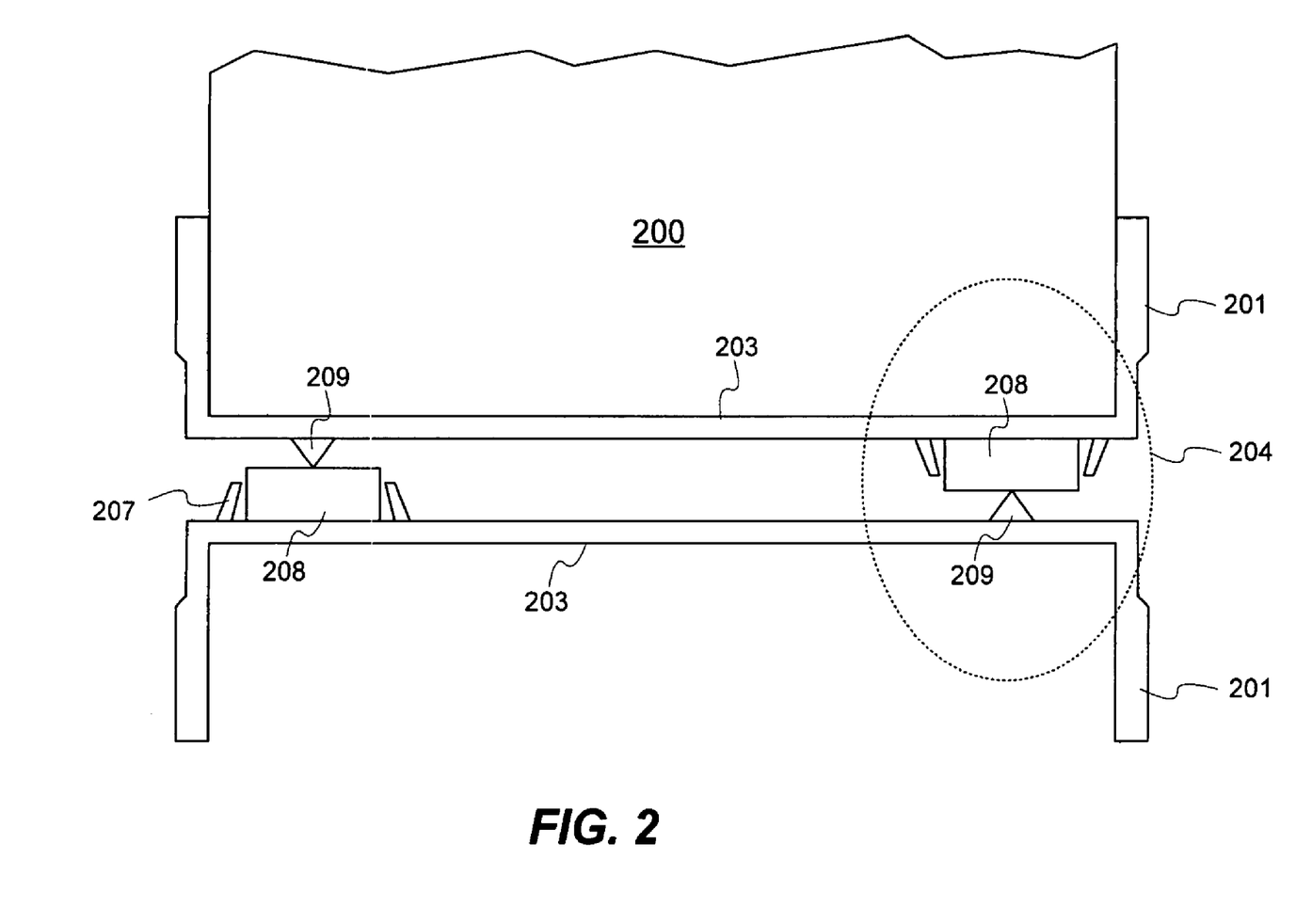
FIG. 2 shows a cross sectional view of a portion of an exemplary filter frame in which the present invention is implemented.
Figure 3:
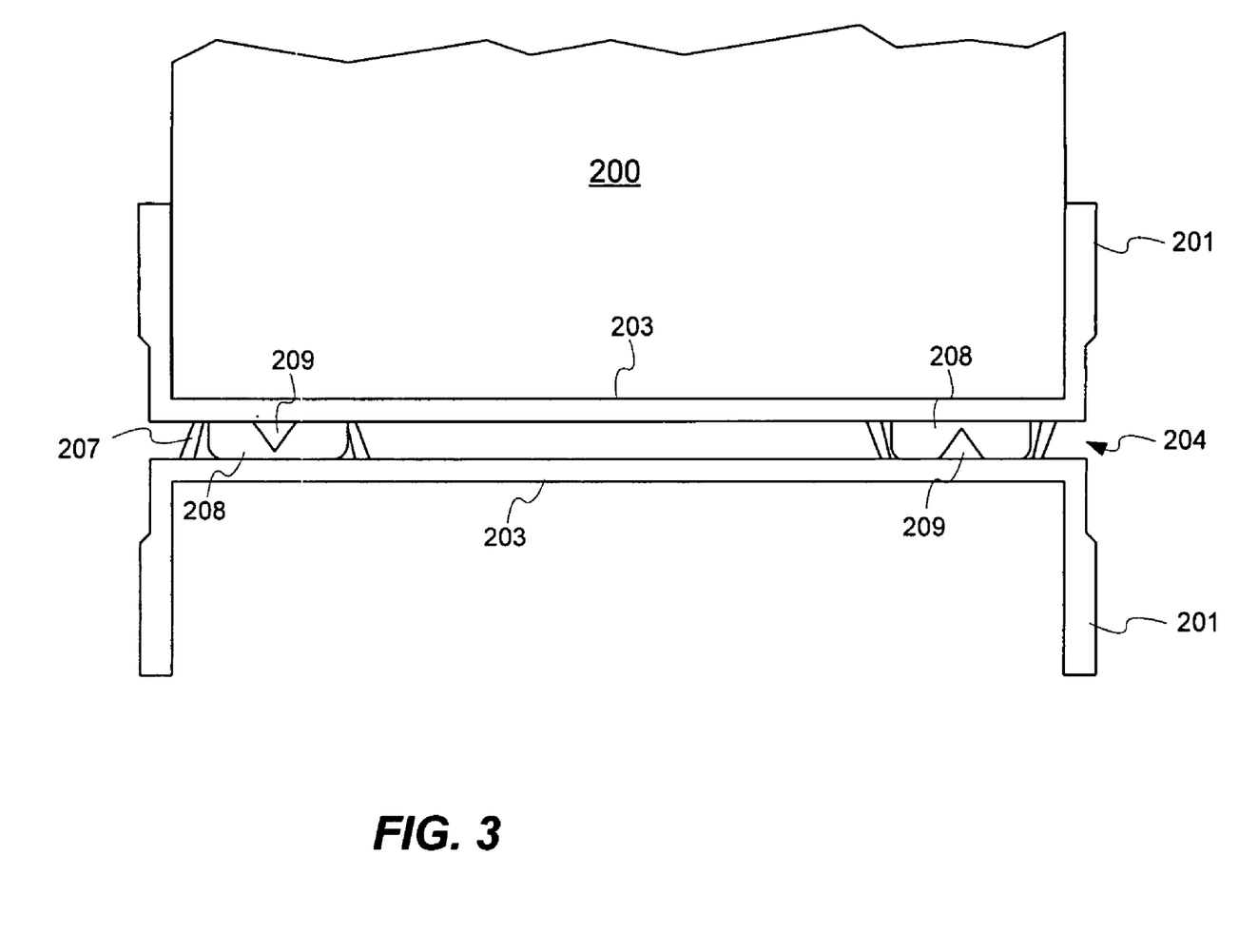
FIG. 3 illustrates a cross sectional view of the filter frame of FIG. 3 in an engaged position.

FIG. 2 shows a cross sectional view of a portion of an exemplary filter frame in which the present invention is implemented. FIG. 2 and FIG. 3 show an interface region between two adjacent (e.g., side by side) filter elements 104 looking downward. Frames 201 comprise a U-shaped channel formed from an extruded plastic, polymeric materials, metal, paper, chipboard, composite or other material that meets the needs of a particular application.

Frame 201 has a base portion 203 that has a first or inner surface to which a filter media material 200 is affixed positioned. Filter media 200 comprises synthetic or natural fibers, woven or knitted materials, foams, or electret or electrostatically charged materials. The filter media 200 may also include sorbents, catalysts, and/or activated carbon (granules, fibers, fabric, and molded shapes). In a particular implementation, filter media 200 is formed as a pleated media that uses a thermosetting glue bead to hold the pleat shape and provide structural stability. A filter media of this type is available from Columbus Industries available under the product designation Microshield. The glue bead is applied before the folding of the filter media and connects the folds with one another at the point of application.

An outer surface of base portion serves as an interface to an adjacent filter element 104. The outer surfaces of filter elements 104 are fitted with complementary components 208 and 209 of a bypass sealing mechanism 204. In the implementation shown in FIG. 2 sealing strip 208 is positioned in a guide 207 to form a landing pad for knife edge 209. Sealing strip 208 comprises a closed cell foam, open cell foam, gel, or other resilient or elastomeric material that will create a seal when engaged by knife edge 209. Exemplary materials include neoprene, polyurethane, silicone, buna-N(Nitril), EPDM, polyethylene, vinyl, gum rubber, latex, natural rubber, styrene-butadiene rubber, viton, santoprene, polyester, epichlorohydrin, butyl, polyimide foam, ionomer foam, Hytrel®, hypalon, ethylene vinyl acetate, polystyrene, melamine foam and the like. As shown in FIG. 3, when two filter frames 104 are pressed together the knife edge 209 is pushed into sealing strip 208 to prevent air flow between adjacent filter frames 104. Seal strip 208 may be formed as a flat structure shown in FIG. 2, or may have a complementary indentation that increases the surface area of contact between knife edge 209. An advantage of increased contact area is an incrementally better seal.

As shown in FIG. 2, each base region 203 is configured with one knife edge 209 and one sealing strip 208. It is contemplated that the invention can be implemented with only one or the other component so long as an adjacent filter frame is configured with a complementary component of the sealing mechanism. Moreover, any number or knife edges 209 and/or sealing strips 208 may be provided. The implementation shown in FIG. 2 provides a double seal as the complementary components 208/209 engage each other.

Figures 4, 5:
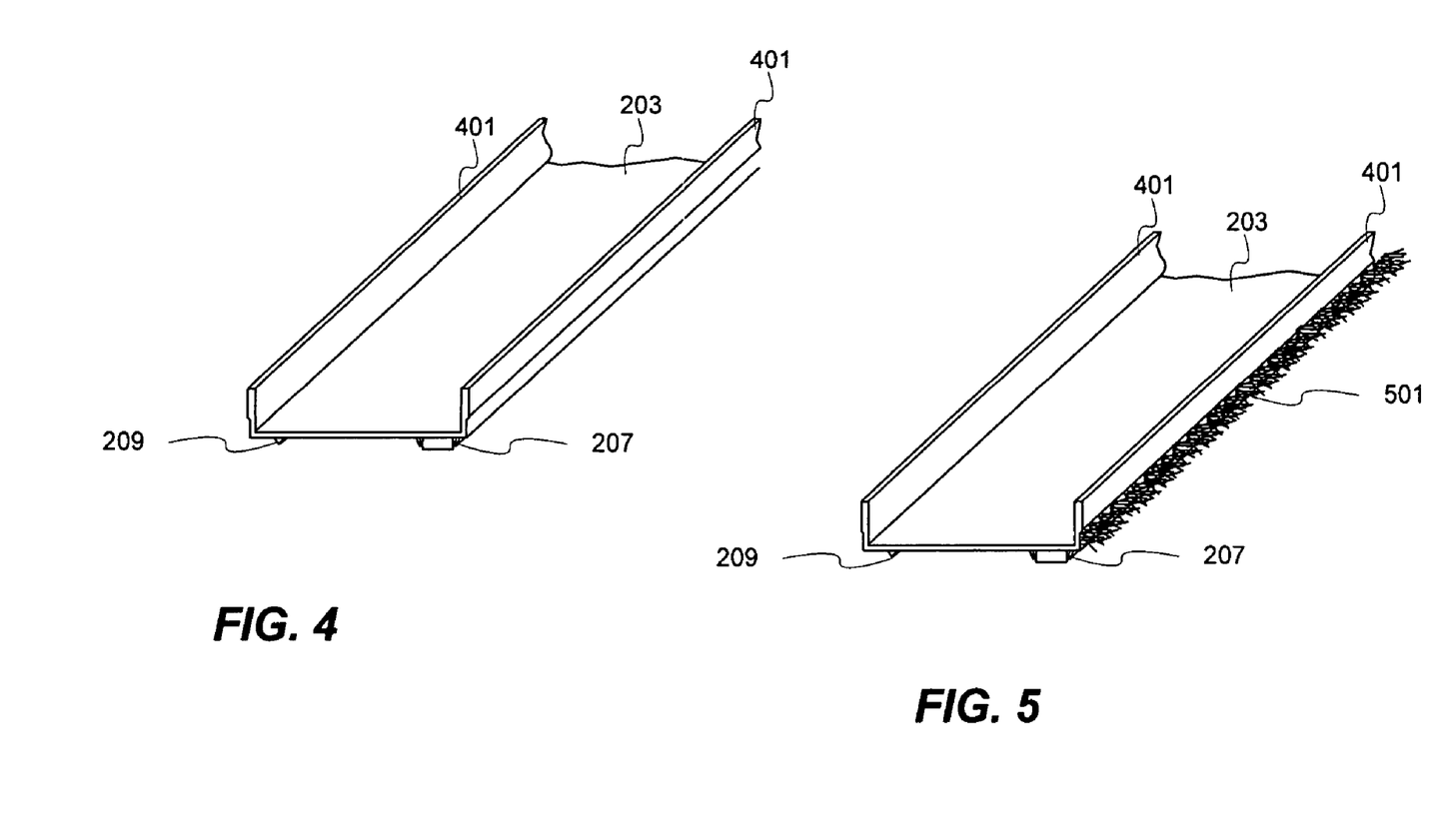
FIG. 4 illustrates a perspective view of an extrusion used to produce a filter frame in accordance with the present invention.
FIG. 5 is a perspective view of another portion of an extrusion used to produce a filter frame in accordance with the present invention.

FIG. 4 illustrates a perspective view of an extrusion 400 that can be continuously extruded with integrally formed protrusions to form knife edge 209 and guides 207. Sealing strip 208, which is typically of a more resilient material composition than the remaining portions of extrusion 400, can be affixed separately using a foam tape, for example. Alternatively, sealing strip 208 can be co-extruded using a suitably resilient material in which case guides 207 may be omitted. Extrusion 400 may include sidewalls that extend substantially orthogonally from the base portion 203 to provide a more rigid construction and better attachment to filter media 200 shown in FIG. 2 and FIG. 3.

To assemble a frame 201 from extrusion 400, sidewalls 401 are cut or notched at desired corner locations. The distance between corner locations defines the length and width of a completed framed filter element 104. The notching allows extrusion 400 to be folded at the corner locations into a frame shape with a single joint used to join ends of extrusion 400 into a continuous frame. At any point filter material 200 may be placed in the channel defined by extrusion 400 and preferably glued to the inside surface of portion 203. Knife edge 209 and sealing strip 208 are positioned symmetrically with respect to a centerline of extrusion 400 so that when the extrusion is flipped the knife edge 209 of a first piece is aligned with the sealing strip 209 of a second frame piece.

FIG. 5 is a perspective view of another portion of an extrusion used to produce a filter frame in accordance with the present invention. The sidewalls 401 will eventually face in the direction of airflow such that one sidewall 401 will be an "upstream sidewall" and the other sidewall 401 will be a downstream sidewall. In operation, air flow will urge the downstream sidewall into contact with the rack or housing in which the framed filter element 104 is mounted. As shown in FIG. 5, a gasket 501 is positioned on the downstream sidewall 401. Gasket 501 is implemented, for example, as a brush gasket which eases the installation, repositioning, and removal of framed filter elements 104 as the brush gasket can move relatively freely against the rack and/or housing. The brush gasket 501 is similar to that found in many high performance sliding windows where it is used to improve air sealing. Gasket 501 may be implemented with a variety of other sealing mechanisms including rubber bulb seals, woven fabric tadpole seals, weather stripping, rope seals, gasket tape, cork, rubber, silicone gel and the like to meet the needs of a particular application.

Figure 6:
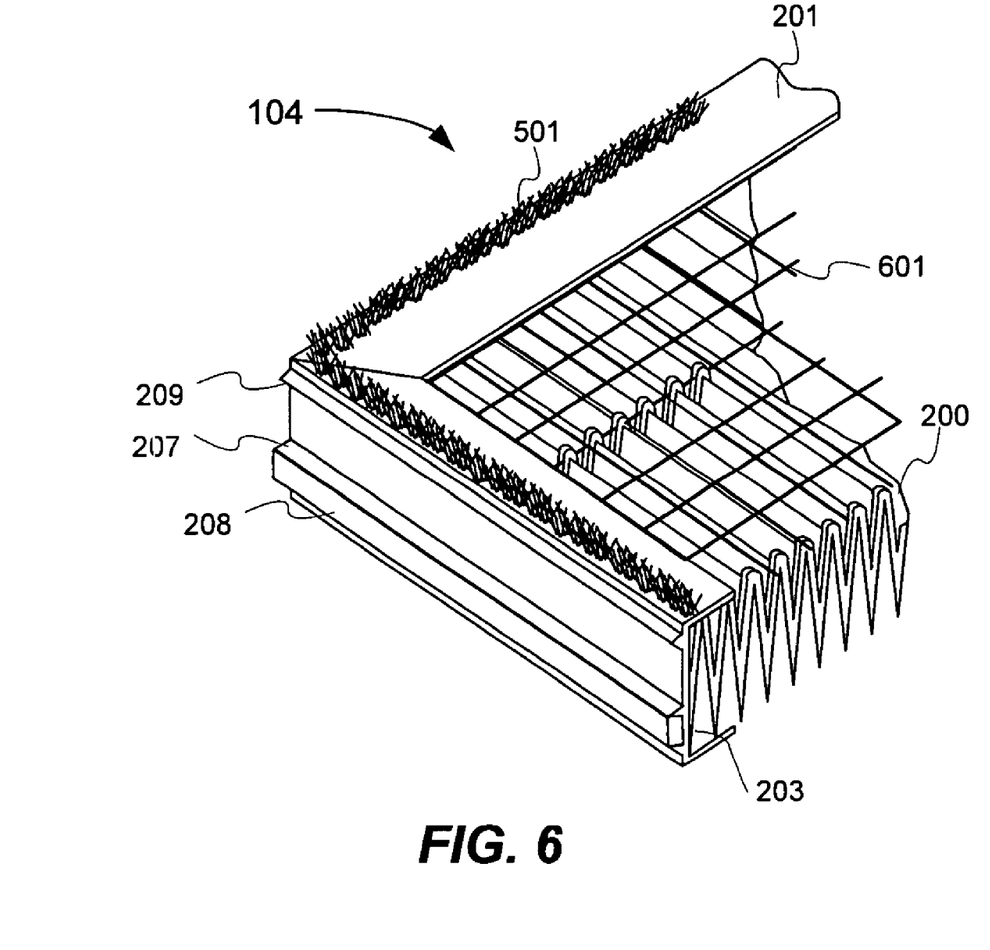
FIG. 6 shows a cut-away perspective view of a filter element in accordance with an embodiment of the present invention.

FIG. 6 shows a cut-away perspective view of a filter element in accordance with an embodiment of the present invention. FIG. 6 is taken looking downward towards the downstream side of the completed framed filter element 104. In the electrically enhanced filter implementation of the preferred embodiment, downstream electrode 601 is attached so as to be in frequent electrical and physical contact with the filter media 200. This arrangement provides improved performance as described in U.S. patent application Ser. No. 10/721,940 which is incorporated herein by reference. As noted hereinbefore, gasket material 501 may be placed at the top and bottom of frame 201, or may be provided so as to substantially circumscribe the downstream sidewall 401 of frame 201. The gasket seal 501 is not necessary on edges where the knife edge/sealing strip provide adequate bypass inhibition, however, it may reduce material cost to only place gasket seal 501 on edges where it is necessary. On the other hand, it may be more cost effective to place it on edges, even edges where it is not strictly required, to make the filter element a more universal, standardized part that needs little attention to field preparation/modification/alignment when being installed. Similarly, sealing strip 208 and knife edge 209 substantially circumscribe the outer surface of base portion 203 of the frame 201. In the case of knife edge 209 and sealing strip 208 there will be a discontinuity at the corners when a sharp corner is made. Discontinuities such as these that make up a relatively small portion (i.e., less than 10%) of the circumference are considered within the meaning of "substantially continuous" as that term is used herein.

Figure 7:
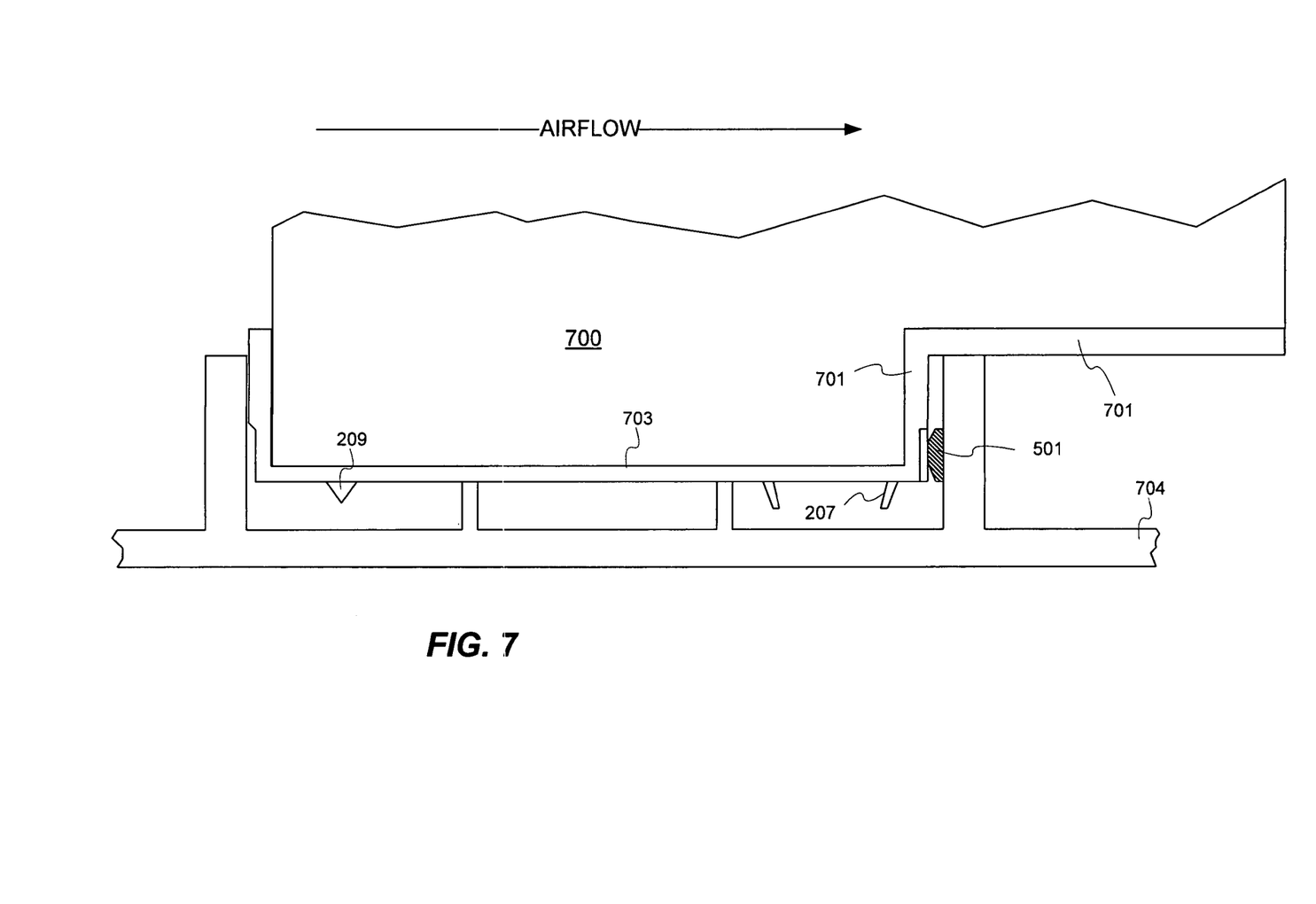
FIG. 7 shows an alternative implementation of the present invention in engagement with a filter rack of an air handling system.

FIG. 7 shows an alternative implementation of the present invention in engagement with a filter rack of an air handling system. FIG. 7 illustrates the operation of brush gasket 501 as airflow pushes the filter assembly so that the gasket 501 forms a seal, or at least a high resistance air path, with the rack 704. As shown in FIG. 7, the complementary sealing mechanism 204 can optionally be omitted on the frame/rack interfaces. This is because many installations have existing racks that will not have components of the complementary sealing mechanism 204 (e.g., knife edge 209 and sealing strip 208) formed on the surfaces of rack 704. Alternatively, the rack surfaces can be outfitted with complementary sealing components to provide even better air-bypass inhibition.

FIG. 7 also illustrates an alternative configuration in which frame 701 is adapted to allow for a filter volume 700 that extends beyond the rack 704. This configuration allows larger, deeper filters and/or filter bags to be used in conjunction with the present invention.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A filter element comprising:
    a frame defining an interior volume and having exterior surfaces;
    a filter media mounted within the frame so as to allow a fluid to enter an upstream side of the filter media and exit a downstream side of the filter media; and
    at least one component of a multi-component filter frame seal, the at least one component being on an outer surface of the frame at a location selected to align to a complementary component of the multi-component filter frame seal, wherein the at least one component is configured to be capable of forming the multi-component filter frame seal with an adjacent filter frame, wherein the at least one component of the multi-component filter frame seal comprises a knife edge circumscribing the frame at a location that will interface with a resilient strip of the adjacent filter frame and a resilient strip circumscribing the frame at a location that will interface with a knife edge of the adjacent frame.

2. The filter element of claim 1 wherein the frame comprises a channel-shaped extrusion having a first surface facing the filter media and a second surface configured to interface with the adjacent filter frame and/or a rack and/or a housing in which the filter element is intended to be used and the at least one component of the multi-component filter frame seal is positioned on the second surface of the extrusion.

3. The filter element of claim 1 wherein the at least one component of the multi-component filter frame seal is formed integrally with the frame.

4. The filter element of claim 1 wherein the at least one component of the multi-component filter frame seal is rigidly affixed to the frame.

5. The filter element of claim 1 wherein the at least one component of the multi-component filter frame seal comprises open cell foam.

6. The filter element of claim 1 wherein the at least one component of the multi-component filter frame seal comprises closed cell foam.

7. The filter element of claim 1 wherein the at least one component of the multi-component filter frame seal comprises gel.

8. The filter element of claim 1 wherein the at least one component of the multi-component filter frame seal comprises a resilient material having an indentation configured to interface with the knife edge formed on the adjacent filter frame.

9. The filter element of claim 1 wherein the frame comprises plastic.

10. The filter element of claim 1 further comprising a conductive grid in contact with the downstream side of the filter media.

11. The filter element of claim 1 wherein the at least one component of the multi-component filter frame seal comprises at least two components each configured to interface with a complementary filter frame seal component on the adjacent frame.

12. The filter element of claim 1 wherein the complementary component is provided on a rack in which the filter element is designed to be positioned.

13. The filter element of claim 1 wherein the complementary component is provided on the adjacent filter frame.

14. An air filtration assembly comprising:
a rack defining a channel to hold an array of framed filter elements;
a plurality of framed filter elements positioned in the channel in a side-by-side relationship; and
complementary bypass sealing mechanisms formed integrally with the framed filter elements such that adjacent filter elements seal against each other when pressed together, wherein the complementary bypass sealing mechanism comprises a knife edge circumscribing the frame at a location that will interface with a resilient strip of an adjacent filter frame and a resilient strip circumscribing the frame at a location that will interface with a knife edge of an adjacent frame.

15. The air filtration assembly of claim 14 further comprising a gasket formed on a downstream edge of the framed filter element, wherein the gasket is aligned to sealably contact the rack when the framed filter element is positioned in the channel.

16. The air filtration assembly of claim 14 wherein the framed filter elements are replaceable by sliding filter elements along the channel.

17. The air filtration assembly of claim 14 wherein the framed filter elements are replaceable by loading filter elements into the channel from the front or back of the array of filter elements.

18. An extrusion for use in manufacture of a framed air filter, the extrusion comprising:
a knife edge running the length of the extrusion and positioned on a first surface of the extrusion at a location that will interface with a resilient strip of an adjacent filter frame; and
a resilient strip running the length of the extrusion and positioned on a first surface of the extrusion at a location that will interface with a knife edge of an adjacent frame.

* * * * *